(12) United States Patent
Barker

(10) Patent No.: US 8,490,202 B2
(45) Date of Patent: Jul. 16, 2013

(54) METHOD FOR MASKING DATA

(75) Inventor: David A. Barker, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/061,547

(22) PCT Filed: Sep. 18, 2009

(86) PCT No.: PCT/EP2009/062136
§ 371 (c)(1),
(2), (4) Date: Mar. 1, 2011

(87) PCT Pub. No.: WO2010/037645
PCT Pub. Date: Apr. 8, 2010

(65) Prior Publication Data
US 2011/0191857 A1    Aug. 4, 2011

(30) Foreign Application Priority Data
Sep. 30, 2008 (EP) .................................... 08165449

(51) Int. Cl.
*G06F 7/04* (2006.01)

(52) U.S. Cl.
USPC .......................................................... 726/26

(58) Field of Classification Search
USPC ............................................................ 726/26
See application file for complete search history.

(56) References Cited

U.S. PATENT DOCUMENTS

| | | | |
|---|---|---|---|
| 6,665,389 B1 | 12/2003 | Haste, III | |
| 2003/0084103 A1* | 5/2003 | Weiner et al. | 709/205 |

* cited by examiner

*Primary Examiner* — Jacob Lipman
(74) *Attorney, Agent, or Firm* — Matthew J. Bussan

(57) ABSTRACT

A method for masking data in communications comprising: assigning a user identifier and a tag to private data associated with a user, wherein the user identifier and the tag is associated with the private data in a data structure associated with a second data processing node; receiving a request for a first list from a first data processing node; sending to a second request for a second list of user identifiers associated with a corresponding one or more users and sending a third request for one or more tags assigned to private data of the one or more users. The second list is merged with the one or more tags in order to generate the first list which is sent to the first data processing node. The first list can be used to initiate a communication request without requiring private data to be stored on the first data processing node.

22 Claims, 5 Drawing Sheets

METHOD FOR MASKING DATA

FIELD OF THE INVENTION

The present invention relates to a method for masking data.

BACKGROUND OF THE INVENTION

Websites comprising social networking applications offer a number of ways to interact and communicate with people, from voice communications to instant messaging.

However, a user typically does not share private data (e.g. contact details such as a telephone number) with other users or shares private data with known contacts only to e.g. prevent unwarranted communications such as spam.

Notwithstanding the above, a user may want to withhold their contact details simply because e.g. the user does not know whether they will be at a particular location at a particular time e.g. the user may prefer for other users to contact them by using a particular telephone number (e.g. a mobile telephone number; a business telephone number; a work telephone number).

It is known to develop a social networking application (e.g. associated with a server data processing system) wherein private data associated with a user is managed such that the private data is typically kept at the server data processing system and is not transmitted to other users.

For example, U.S. Pat. No. 6,665,389 discloses an interactive Internet-based dating service allowing people to anonymously interact via Internet browsers, telephone communications and/or video conferencing. The system employs an interactive web site allowing a person to seek another person who may be compatible for a relationship. The system gives the member the option to allow other members to make contact via email, telephone or video conferencing. All communications through the system are completely anonymous in that the searcher is never provided with the member's actual email address or phone numbers.

It should be understood that typically, in such an Internet-based system, communications from a client system occur by use of a browser—typically, private data associated with a server system is not stored on the client system.

There is a need for a mechanism which allows a client system such as a mobile device which typically does not use a browser to communicate with a server system without requiring private data to be stored on the client system.

SUMMARY OF THE INVENTION

According to a first aspect, the present invention provides a method for masking data in communications between a first data processing node and a second data processing node, comprising: assigning a user identifier and a tag to private data associated with a user, wherein the user identifier and the tag is associated with the private data in a data structure associated with the second data processing node; receiving, by a first entity, a first request for a first list from the first data processing node; sending to a second entity, in response to the first entity receiving the first request, a second request for a second list of user identifiers associated with a corresponding one or more users and sending to a third entity, a third request for one or more tags assigned to private data of the one or more users; merging, in response to the first entity receiving the second list and the one or more tags, the second list with the one or more tags in order to generate the first list; sending the first list to the first data processing node; receiving a communication request comprising a first user identifier and a first tag each selected from the first list, wherein the first user identifier and the first tag are associated with a first user, from the first data processing node, using the first user identifier and the first tag to derive first private data associated with the first user in accordance with the data structure; and using the derived first private data to process the communication request, such that the first private data is not stored on the first data processing node.

According to a second aspect, the present invention provides an apparatus for masking data in communications between a first data processing node and a second data processing node, comprising: means for assigning a user identifier and a tag to private data associated with a user, wherein the user identifier and the tag is associated with the private data in a data structure associated with the second data processing node; means for receiving, by a first entity, a first request for a first list from the first data processing node; means for sending to a second entity, in response to the first entity receiving the first request, a second request for a second list of user identifiers associated with a corresponding one or more users; means for sending to a third entity, in response to the first entity receiving the first request, a third request for one or more tags assigned to private data of the one or more users; means for merging, in response to the first entity receiving the second list and the one or more tags, the second list with the one or more tags in order to generate the first list; means sending the first list to the first data processing node; means for receiving a communication request comprising a first user identifier and a first tag each selected from the first list, wherein the first user identifier and the first tag are associated with a first user, from the first data processing node, means for using the first user identifier and the first tag to derive first private data associated with the first user in accordance with the data structure; and means for using the derived first private data to process the communication request, such that the first private data is not stored on the first data processing node.

According to a third aspect, the present invention provides a computer program comprising program code means adapted to perform all the steps the method above when said program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION

It should be understood that social networking applications are described herein for exemplary purposes only.

It should be understood that the terms client data processing system and server data processing system are used for exemplary purposes only.

With the advent of high-speed mobile internet access (typically known as "mobile broadband"), accessing websites using a mobile device (e.g. a Smart phone or Personal Digital Assistant (PDA)), is becoming increasingly prevalent as e.g. users seek to keep in contact and with their friends, regardless of where they are.

When using a mobile device to access the Internet, rather than using a browser, an application specifically written to run on the mobile device can be used e.g. so that features associated with the mobile device itself (e.g. GPS) can be utilised. Using such an application can result in different capabilities from using a browser as for example, private data associated with a server system can be stored on the mobile device. For reasons of privacy and e.g. data protection, there is a need for a mechanism which allows a client system such as a mobile device to communicate with a server system without requiring private data to be stored on the client system.

Figure 1:
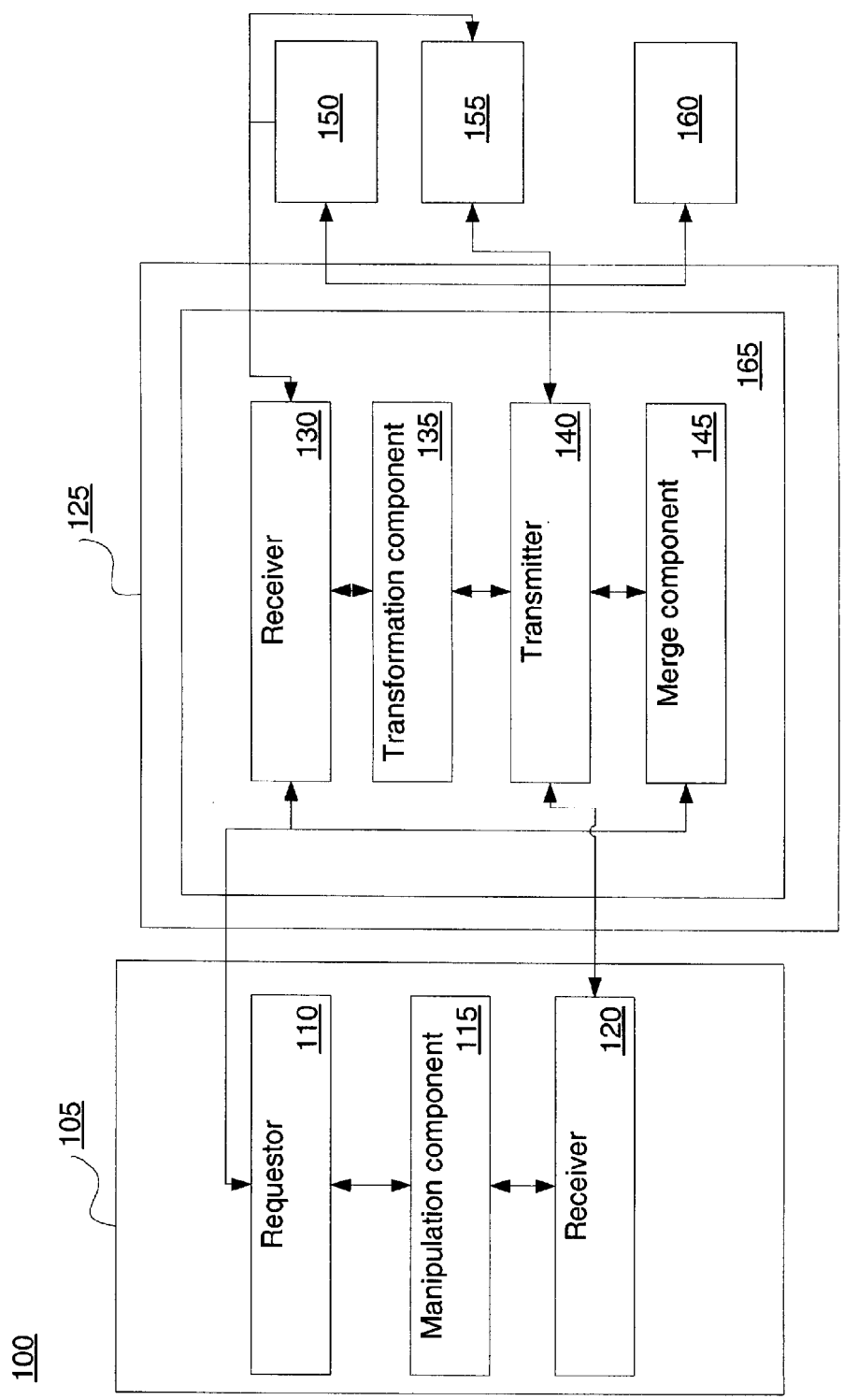
FIG. 1 is a block diagram of a system according to the preferred embodiment.

FIG. 1 is a block diagram depicting a system (100) according to the preferred embodiment.

The system (100) comprises a client data processing system (105) operable to connect to a server data processing system (125) using a network. In the example herein, the client data processing system (105) uses an Internet Protocol (IP)-based protocol, such as a publish/subscribe messaging protocol to maintain a connection with the server data processing system (125). Advantageously, this allows for data to be pushed to the client data processing system (105) "on demand". Preferably, the client data processing system (105) uses Session Initiation Protocol (SIP), which is a signalling protocol, to communicate with the server data processing system (125). Using SIP advantageously allows data to be pushed to the client data processing system (105).

The client data processing system (105) may comprise a computer, a mobile telephone, a Personal Digital Assistant (PDA) etc.

The server data processing system (125) is operable to communicate with a first application (150); a second application (155) and a third application (160) using one or more networks. In the example herein, the first application (150) is operable to manage and serve lists of users; the second application (155) is operable to manage private data associated with a user—wherein the second application (155) is preferably a social network application and is operable to communicate with a social network framework and wherein the server data processing system (125) is operable to communicate with the second application (155) using a web service; and the third application (160) is operable to manage communications (e.g. telephone calls; e-mails etc.) between users.

The client data processing system (105) comprises a requestor (110); a manipulation component (115) and a first receiver (120).

The server data processing system (125) comprises an apparatus (165) comprising a second receiver (130); a transformation component (135); a transmitter (140) and a merge component (145).

Figure 2:
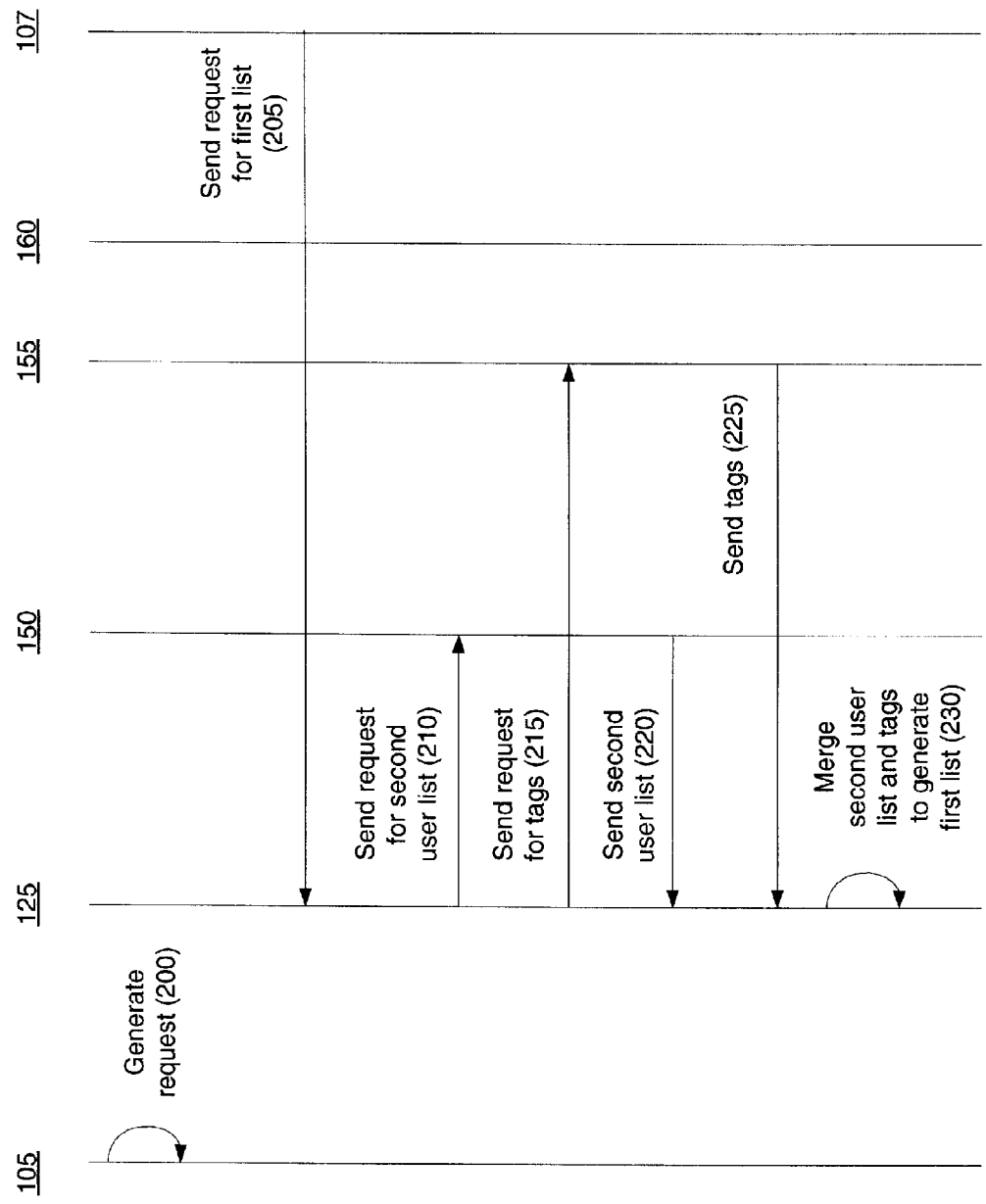
FIG. 2 is a flow chart showing the operational steps involved in a process of the preferred embodiment.
Figure 2:
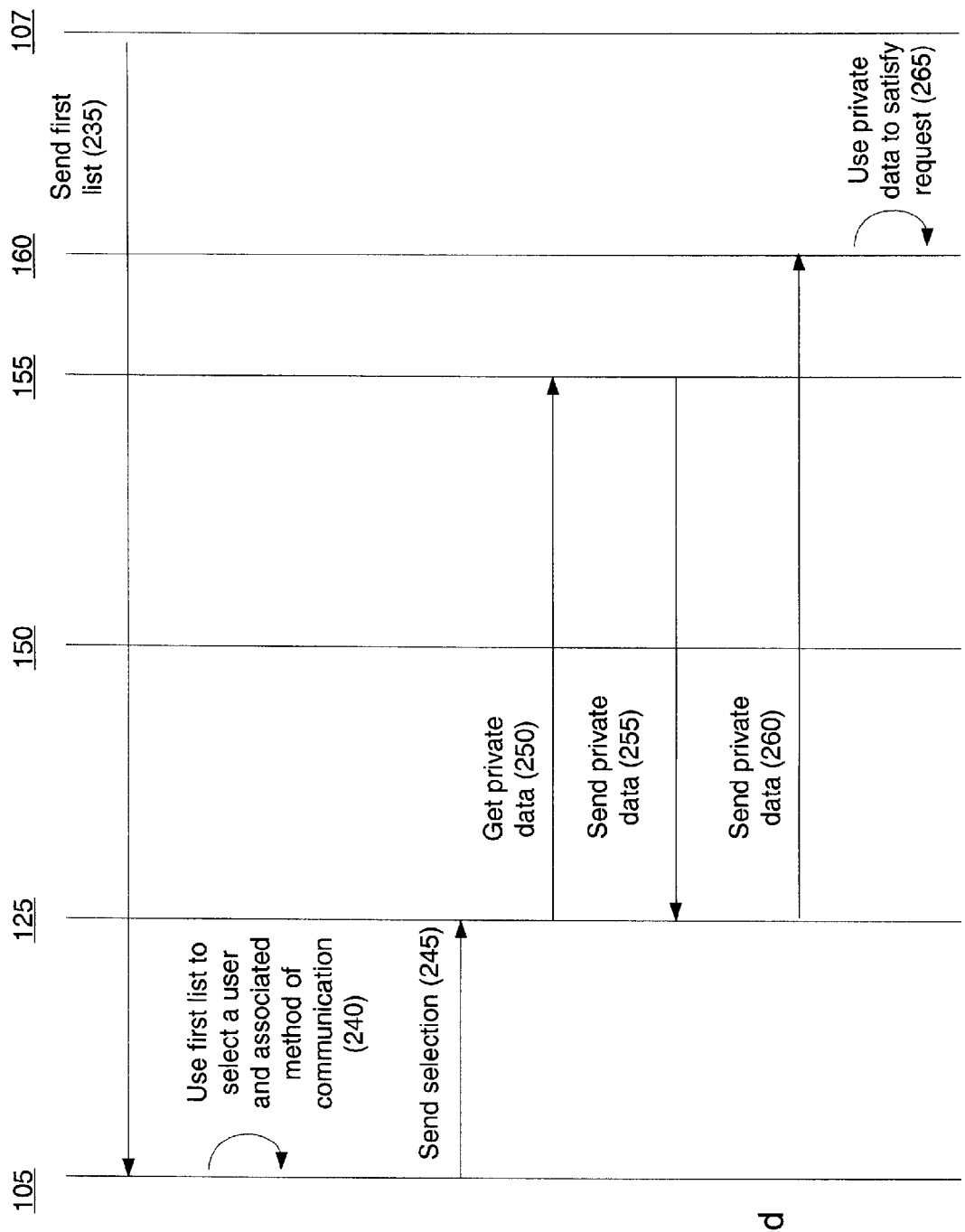

A process of the preferred embodiment will now be described with reference to FIGS. 1 and 2.

At step 200, a user accesses the requestor (110) of the client data processing system (105) to generate a first request. In the example herein, the first request is associated with a request for a first list comprising user contacts and method(s) of communication associated with the user contacts. In one example, the first request is represented as follows:
First Request:
topic: <User_1>/toserver/control
message body: message=First_app&list=list_1.xml In the example herein, the client data processing system (105) uses a publish and subscribe protocol to publish the request (a message). Publish and Subscribe (pub/sub) is an effective way of disseminating information to multiple users. Pub/Sub can help to simplify the task of getting business messages and transactions to a wide, dynamically changing and potentially large audience in a timely manner.

In a pub/sub system, publishers are not concerned with where their messages are going, and subscribers are not interested in where the messages they receive have come from. Instead, a matching engine typically assures the integrity of the message source and manages the distribution of a message according to subscriptions registered with the matching engine.

Figure 3:
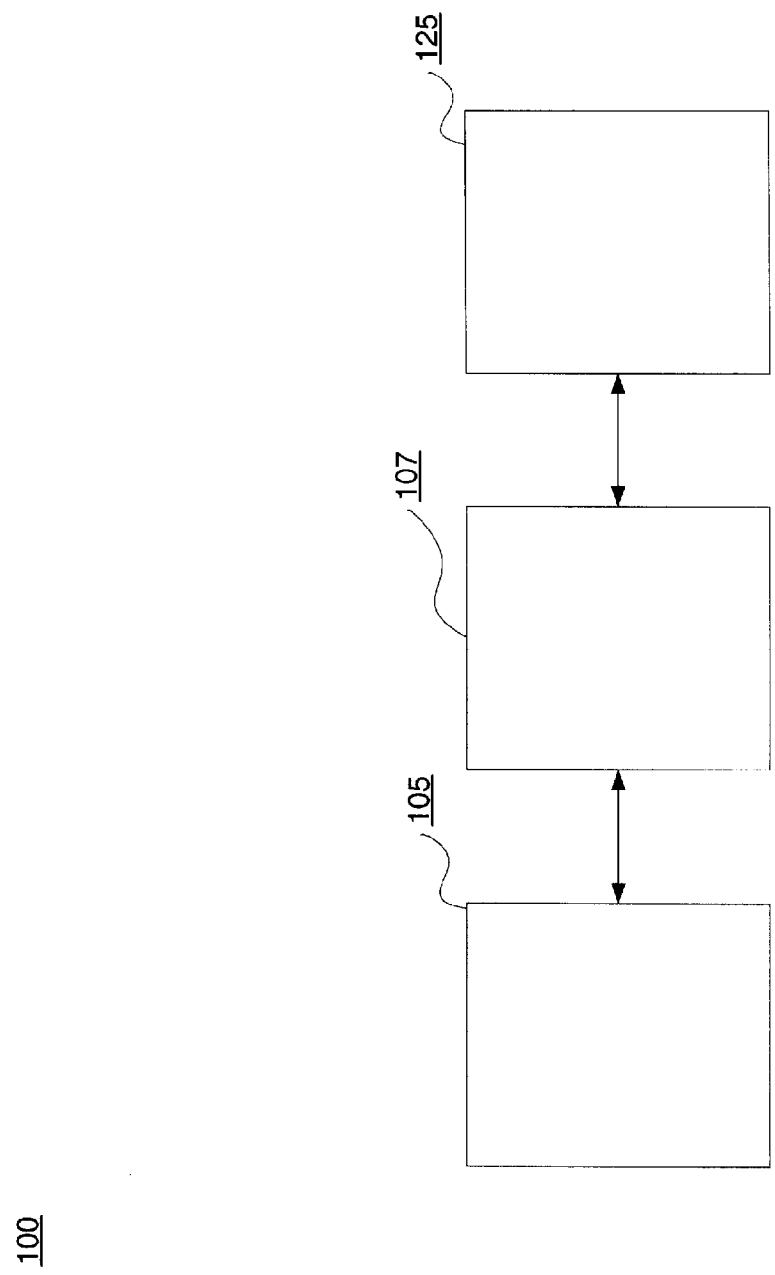
FIG. 3 is a block diagram of a publish/subscribe subsystem of the system of FIG. 1.

Message topics typically provide the key to the delivery of messages between publishers and subscribers. With reference to FIG. 3, in the example herein, instead of including a specific destination address in each message, a publisher, namely the client data processing system (105), assigns a "topic" to the first request, namely "<User_1>/toserver/control".

In the topic, the text string "<User_1>" specifies a user identifier of the user; "toserver" is used for example, to provide information associated with the direction of the first request (e.g. wherein the first request is being sent to a server data processing system), to indicate that the first request will result in actions undertaken by a component other than the client data processing system (105); and "control" is used to specify to the receiver of the first request that it needs to process the first request.

The message body associated with the first request indicates to the receiver of the first request that it needs to contact the first application (150) and request a list, the specific list comprising a list identifier associated with the first list of user contacts, namely list_1.xml.

The requestor (110) publishes the first request to the matching engine (107).

The matching engine (107) is operable to match the topic of the published first request with a list of subscribers who have subscribed to receive messages that are published to that topic. In the example herein, the server data processing system (125) subscribes to the topic "<User_1>/toserver/control".

In response to a match, the matching engine (107) sends (step 205) the published first request to the subscriber, namely, to the server data processing system (125).

In response to receiving the first request, the second receiver (130) passes the first request to the transformation component (135).

The transformation component (135) parses the topic and interprets the first request as a control message and in response, the transformation component (135) parses the message body.

In response to reading the list identifier list_1.xml, the transformation component (135) is pre-configurable to generate a second request associated with obtaining a second list of user contact identifiers for the user contacts associated with list_1.xml. In one example, the second request is represented as follows:
Second Request:
GET http://first_app/list_2.xml The second request comprises a "GET" command (e.g. a HTTP command) and "http/first_app/list_2.xml" specifies the directory (e.g. "http/first_app/" and file identifier (e.g. "list_2.xml") associated with the second list.

Preferably, the transformation component (135) is responsible for conversion between the protocol (e.g. SIP) used by the client data processing system (105) and the protocol (e.g. HTTP) used by the first application (150).

Preferably, the transmitter (140) uses a HTTP based protocol to send (step 210) the second request to the first application (150).

In response to reading the list identifier list_1.xml, the transformation component (135) is also pre-configurable to generate a third request associated with obtaining one or more "tags" for the user contacts associated with list_1.xml.

In the example herein, a tag represents metadata (e.g. a numeral (e.g. "0")) that is associated with private data associated with one or more methods of communication by which a user contact can be contacted. In the preferred embodiment, a numeral is associated with each tag—alternatively, numerals can be used in any number of different ways e.g. a numeral can be associated with a single method of communication and if a plurality of methods of communication are required to be represented by a tag, preferably, the numeral for each of the plurality of methods of communication are aggregated (e.g. summed) such that a resulting numeral is generated. Preferably, the resulting numeral is the tag which represents the plurality of methods of communication.

The tag does not comprise the private data. The tag is preferably associated with a user contact's preferred method(s) of communication. Preferably, more than one type of method of communication can be associated with a tag.

In another embodiment, preferably, more than one tag can be associated with a user contact.

Other examples of tags and the associated method(s) of communication (e.g. associated with telephone numbers (e.g. mobile telephone numbers, fixed line telephone numbers) for receiving telephone calls and network addresses (e.g. an e-mail address for receiving e-mails, a mobile telephone number for receiving SMS messages) for receiving messages) comprise:

7=call fixed line, receive email, receive SMS
6=call mobile, receive email, receive SMS
5=call fixed line, receive SMS only
4=call mobile, receive SMS only
3=call fixed line, receive email only
2=call mobile, receive email only
1=call fixed line (no email or SMS messages)
0=call mobile (no email or SMS messages)

In a preferred embodiment, each tag and its associated method(s) of communication is transmitted to or stored on the client data processing system (105) in advance.

Preferably, each numeral value of a tag is a sum of the following individual tags, depending on the particular method(s) of communication represented by a tag:

0=mobile telephone number
1=fixed line telephone number
2=email-address
4=SMS

For example, the value for tag "7" (termed herein an "aggregate tag") is an aggregate value of the individual values of tags (termed herein "individual tags") "1" (call fixed line), "2" (receive email) and "4" (receive SMS).

Preferably, for tag 4, a registered mobile telephone number is used to communicate SMS messages.

As described above, the transformation component (135) is pre-configurable to generate a third request associated with obtaining one or more tags for the user contacts associated with list_1.xml. In one example, the third request is represented as follows:

Third Request:
<xml><tagRequest userid=User_1></tagRequest>

The third request comprises an XML document comprising a request for tags (denoted by the XML tags "tagRequest and /tagRequest") associated with user contacts associated with the user.

In the example herein, as the server data processing system (125) does not yet have a list of user contacts associated with the user, the user identifier associated with the user (e.g. "User_1") is included in the third request.

Alternatively, the server data processing system (125) is operable to wait for a response to the second request, wherein the response comprises the second list of user contact identifiers for the user contacts associated the user, before sending the third request. In the alternative embodiment, the third request comprises a request for tags associated with user contacts associated with the user and at least one of: a list identifier of the second list or the user contact identifiers. Preferably, the transformation component (135) is responsible for conversion between the protocol (e.g. SIP) used by the client data processing system (105) and the protocol (e.g. HTTP) used by the second application (155).

Preferably, the transmitter (140) uses a HTTP based protocol to send (step 215) the third request to the second application (155).

In one example, the transmitter (140) uses a web service associated with the second application (155) to send the third request.

In response to receiving the second request, the first application (150) uses the user identifier "<User_1>" to retrieve (e.g. from a database) a second list of user contacts for the user.

At step 220, the first application (150) sends a first response comprising the second list to the second receiver (155) using the HTTP protocol. In one example, the first response is represented as follows:

First Response:
<list_2><user id="User_2" name="John"/><user id="User_3" name="Alice"/><user id="User_4" name="Tom"/></list_2>

The first response comprises an XML document comprising the second list (identified by the XML tags "<list_2> and </list_2>") which comprises, for each user contact, a user contact identifier (e.g. "user id="User_2"") and a name (e.g. "name="John"").

Furthermore, in response to receiving the third request, the second application (155) uses the user identifier "<User_1>" to retrieve (e.g. from a storage component associated with a social network framework) tags associated with the second list of user contacts for the user.

Preferably, the second list of user contacts is registered with the second application (155) in advance.

At step 225, the second application (155) sends a second response comprising the tags to the second receiver (155) using the HTTP protocol and the web service. In one example, the second response is represented as follows:

Second Response:
<tagRequest userid=User_1><user id=<User_2> tag=2/><user id=<User_3> tag=3/><user id=<User_4> tag=4/></tagRequest>

The second response comprises an XML document specifying, for each user contact, a user contact identifier (e.g. "User_2") and an associated tag (e.g. "2").

Advantageously, using numerals for the tags minimises the amount of data that is sent over the network.

Alternatively, the second response can comprise data (e.g. an XML document comprising a user's method(s) of communication and associated tag) which the server data processing system (125) can use to derive the tag associated with the user.

Preferably, a tag for a user contact is stored with private data (e.g. method(s) of communication) in a profile that is associated with the second application (155).

Preferably, private data associated with the user (e.g. "User_1") is also stored in a profile.

For example, examples of profiles for the user contacts are shown below:
Profiles:
User_1=0=09876 543211
User_2=2=09876 543210 (0), john@company_b.com (2)
User_3=3=01234 567890 (1), alice@company_a.com (2)
User_4=4=09999 999999 (0)

For User_1, a mobile telephone number (having an individual tag of "0") is stored as the private data associated with the tag for User_1 that specifies that User_1 can be contacted by a call to their mobile telephone.

For User_2, a mobile telephone number (having an individual tag of "0") and an e-mail address (having an individual tag of "2") are stored as the private data associated with the aggregate tag for User_2 that specifies that User_2 can be contacted by a call to their mobile telephone and by e-mail.

For User_3, a fixed line telephone number (having an individual tag of "1") and an e-mail address (having an individual tag of "2") are stored as the private data associated with the aggregate tag for User_3 that specifies that User_3 can be contacted by a call to their fixed line telephone and by e-mail.

For User_4, only a mobile telephone number (having an individual tag of "0") is stored as the private data associated with the aggregate tag for User_4 that specifies that User_4 can be contacted by SMS messages to their mobile telephone and preferably, for tag 4, a registered mobile telephone number is used to communicate SMS messages.

In response to receiving the second list of user contacts and the tags, the second receiver (155) passes the list of user contacts and the tags to the merge component (145).

At step 230, the merge component (145) merges the list of user contacts with the tags to create the first list. An example of the first list is shown below:
User_2=John; 2
User_3=Alice; 3
User_4=Tom; 4

Preferably, the transformation component (135) generates a third response (wherein the third response is a response to the first request) comprising the first list. In one example, the third response is represented as follows:
Third Response:
topic: <User_1>/todevice/control
message body: message=list_1|User_2=john,2; User_3=alice,3; User_4=tom,4

In the topic, the text strings "<User_1>" is defined as above; the text string "todevice" is used to provide information associated with the direction of the third response (e.g. wherein the third response is being sent to a client data processing system), to indicate that the third response will result in actions undertaken by a component other than the server data processing system (125); and the text string "control" is used to specify to the receiver of the third response that it needs to process the third response.

The message body associated with the third response comprises the first list of user contacts having, for each user contact, a user contact identifier and a tag.

Note that the message body does not contain private data associated with the user contacts.

Preferably, the user makes a single request (e.g. the first request) and receives a single response (e.g. the third response). Advantageously, this saves on bandwidth associated with communications to/from the client data processing system (105)—this is important if the client data processing system (105) is, for example, a pervasive device such as a mobile telephone which has reduced computational capacity and ad-hoc access to a network. Furthermore, in order to generate the third response, preferably, the server data processing system (125) generates a plurality of requests (e.g. the second request and the third request), merges the responses (e.g. the first response and the second response) and sends the resulting response (e.g. the third response) to the client data processing system (105). Advantageously, as the server data processing system (125) typically has increased computational capability and more reliable access to a network than the client data processing system (105), the computational and network intensive processes of generating the plurality of requests, receiving a plurality of responses and merging the plurality of responses are delegated to the server data processing system (125).

The transformation component (135) passes the third response to the transmitter (140) which publishes the third response to the matching engine (107).

The matching engine (107) is operable to match the topic of a published third response with a list of subscribers who have subscribed to receive messages that are published to the topic. In the example herein, the client data processing system (105) subscribes to the topic "<User_1>/todevice/control".

In response to a match, the matching engine (107) (depicted in FIG. 3) sends (step 235) the published third response to the subscriber, namely, to the client data processing system (105).

In response to receiving the third response, the first receiver (120) passes the third response to the manipulation component (115).

The manipulation component (115) parses the topic and interprets the third response as a control message and in response, the manipulation component (115) parses the message body.

The manipulation component (115) uses the data in the message body of the third response and the data associated with each tag and its associated method(s) of communication which the client data processing system (105) received in advance, to manipulate the user interface of the client data processing system (105).

Preferably, the manipulation component (115) displays the user contacts in the first list (namely, "John"; "Alice"; "Tom") using the user interface. More preferably, the manipulation component (115) uses the tags associated with the user contacts and the data received in advance to display user interface components.

For example, for "John", as the tag "2" represents the methods of communication of "call mobile" and "receive email only", the manipulation component (115) is configurable to display a first radio button with associated text "Call Mobile Telephone" and a second radio button with associated text "Send e-mail".

For "Alice", as the tag "3" represents the methods of communication of "call fixed line" and "receive email only", the manipulation component (115) is configurable to display a third radio button with associated text "Call Fixed Line Telephone" and a fourth radio button with associated text "Send e-mail".

For "Tom", as the tag "4" represents the methods of communication of "call mobile" and "receive SMS only", the manipulation component (115) is configurable to display a fifth radio button with associated text "Call Mobile Telephone" and a fourth radio button with associated text "Send SMS".

It should be understood that alternatively, for each user contact, each possible method of communication can be displayed and the "preferred" method(s) of communication denoted by the tag associated with a user contact can be e.g. highlighted, pre-selected etc. For example, for "John", radio buttons associated with calling a fixed line telephone, calling a mobile telephone, receiving e-mail and receiving SMS can be displayed and the radio buttons associated with calling a mobile telephone and receiving e-mail (which are the methods of communication denoted by the tag associated with John) can be e.g. highlighted, pre-selected etc.

At step 240, the user uses the user interface to select a user contact (e.g. "John") and an associated method of communication (e.g. "Calling Mobile Telephone").

Preferably, if a user contact has more than one associated method of communication, the user is able to select one of the associated methods of communication. More preferably, if a user contact has specified a preferred method of communication, the user is able to override the preferred method of communication by selecting another method of communication.

In response to step 240, the manipulation component (115) generates a fourth request comprising a user identifier associated with the user and an individual tag (e.g. "0") representing a method of communication (e.g. "mobile telephone") and a user contact identifier (e.g. "User_2") associated with the selected user contact and an individual tag (e.g. "0") representing the selected method of communication (e.g. "mobile telephone"). In one example, the fourth request is represented as follows:

Fourth Request:
topic: <User_1>/toserver/control
message body: message=call| User_1=0; User_2=0

The fourth request comprises a topic as described above and a message body specifying a request to establish a telephone call (e.g. "message=call|"); a user identifier (e.g. "User_1") of the requesting user and their associated tag (e.g. "0") representing a method of communication (e.g. "mobile telephone") and a user contact identifier (e.g. "User_2") of the selected user contact and their associated tag (e.g. "0") representing the selected method of communication (e.g. "mobile telephone").

The requestor (110) publishes the fourth request to the matching engine (107).

In the example herein, as the server data processing system (125) subscribes to the topic "<User_1>/toserver/control", the matching engine (107) sends (step 245) the published fourth request to the server data processing system (125).

In response to receiving the fourth request, the second receiver (130) passes the fourth request to the transformation component (135).

The transformation component (135) parses the topic and interprets the fourth request as a control message and in response, the transformation component (135) parses the message body.

In response, the transformation component (135) is pre-configurable to generate a fifth request associated with obtaining private data (e.g. mobile telephone number) associated with the method of communication (e.g. "mobile telephone") associated with the requesting user (e.g. "User_1") and private data associated with the selected method of communication (e.g. "mobile telephone") associated with the selected user contact (e.g. "User_2").

Preferably, the transmitter (140) uses the HTTP based protocol and the web service to send (step 250) the fifth request to the second application (155). In one example, the fifth request is represented as follows:

Fifth Request:
<privateDataRequest><user id=<User_1> tag=0/><user id=<user 2> tag=0/></privateDataRequest>

The fifth request comprises an XML document specifying a request for private data (e.g. identified by the XML tags "<privateDataRequest> and </privateDataRequest>"), a user identifier associated with the requesting user and their tag and a user contact identifier associated with the selected user and their tag.

In response to receiving the fifth request, the second application (155) uses the user identifier associated with the requesting user (e.g. "User_1") and the individual tag to retrieve the mobile telephone number (e.g. 09876 543211) from the User_1's profile and uses the user contact identifier associated with the selected user (e.g. "User_2") and the individual tag to retrieve the mobile telephone number (e.g. 09876 543210) from User_2's profile.

At step 255, the second application (155) sends a fourth response comprising the mobile telephone numbers of User_1 and User_2 to the second receiver (130) using the HTTP protocol. In one example, the fourth response is represented as follows:

Fourth Response:
<privateDataRequest><user id=<User_1> tag=0 mobilephoneNumber=09876 543211/><user id=<user 2> tag=0 mobilephoneNumber=09876 543210/></privateDataRequest>

The fourth response comprises an XML document comprising, for each user, private data associated with the method of communication denoted by the individual tag.

The second receiver (130) passes the fourth response to the transformation component (135).

In response, the transformation component (135) is configurable to generate a fifth response (wherein the fifth response is a response to the fourth request) for establishing a telephone call. In one example, the fifth response is represented as follows:

Fifth Response:
<call><User_1 mobilephoneNumber=09876 543211/> <User_2 mobilephoneNumber=09876 543210/></call>

The fifth response comprises an XML document comprising a request to establish a telephone call (e.g. identified by the XML tags "<call> and </call>") between User_1 and User_2. The fifth response also comprises private data (e.g. mobile telephone numbers) of User_1 and User_2.

At step 260, the transmitter (140) uses the SIP protocol to send the fifth response to the third application (160).

At step 265, preferably, the third application (160) uses a conferencing service and private data (e.g. the mobile telephone numbers of User_1 and User_2) to satisfy the fourth request by attempting to establish a telephone call between the user (e.g. User_1) and the selected user contact (e.g. User_2).

Advantageously, a telephone call can be established without User_1 having access to User_2's private data and without User_2 having access to User_1's private data.

It should be understood that the telephone call can be established in any number of ways e.g. as a conference call involving more than two users.

Advantageously, the preferred embodiment provides a method for sending data to a client computer data processing system to allow a user to establish communications with a user contact without requiring private data of the user contact to be stored on the client computer data processing system. Advantageously, this improves security as the private data cannot be obtained from the client computer data processing system if it is lost or stolen for example.

The preferred embodiment is particularly advantageous for use with a client computer data processing system such as a mobile device wherein the mobile device comprises a custom application for accessing e.g. the Internet. As described in the background section, such an application can allow for private data associated with a server system to be stored on the mobile device. However, the preferred embodiment allows for the mobile device to communicate with a server system without requiring private data to be stored on the mobile device.

Furthermore, advantageously, user contacts are able to communicate with the user using different communication methods without having to reveal their private data.

Furthermore, advantageously, by using tags and associated private data, a user contact can indicate a preferred method of contact and can easily change the private data associated with a tag (e.g. typically, a user contact can assign a fixed line telephone number to a tag but can change the private data to a mobile telephone number (e.g. temporarily) such that the user cannot contact them on their fixed line telephone).

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Figure 4:
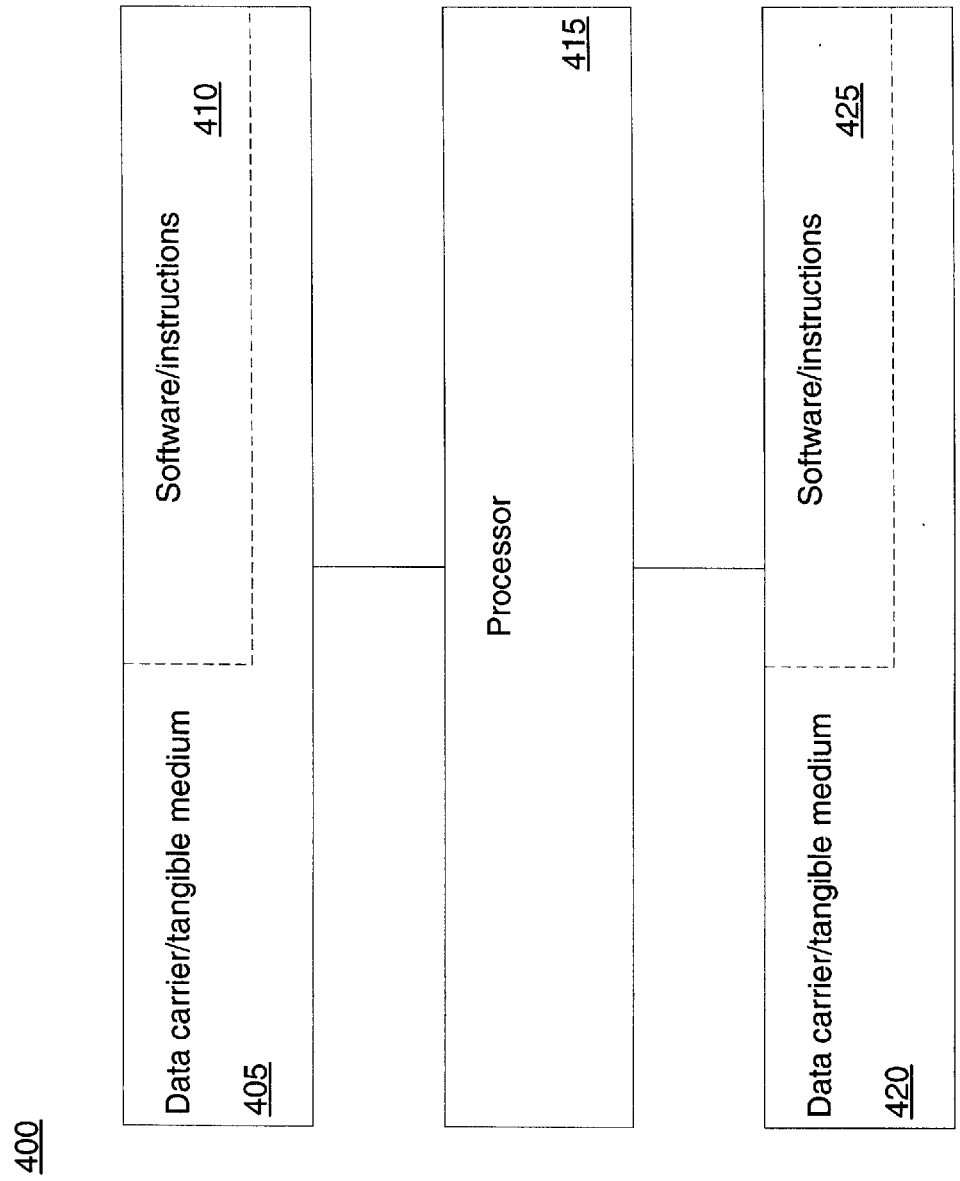
FIG. 4 is a block diagram of a computer system for use with embodiments of the present invention.

FIG. 4 illustrates a computer system (400) for use with embodiments of the present invention.

It will be appreciated that the method and arrangement described above may also suitably be carried out fully or partially in e.g. program code; instructions or software (425) running on one or more processors (415), and that the software may be provided in the form of one or more computer program elements carried on any suitable data-carrier (405, 420) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with the computer system (400). Such an implementation may comprise a series of computer-readable e.g. program code; instructions or software (410) either fixed on a tangible storage medium, such as a computer readable storage medium (405, 420), for example, diskette, CD-ROM, ROM, or hard disk, or transmittable to the computer system (400), via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. A method for masking data in communications between a first data processing node and a second data processing node, comprising:

assigning a user identifier and a tag to private data associated with a user, wherein the user identifier and the tag are associated with the private data in a data structure associated with the second data processing node, and wherein the tag comprises a numerical value associated with one or more methods of communication by which a user contact prefers to be contacted;

receiving, by a first entity, a first request for a first list from the first data processing node;

sending to a second entity, in response to the first entity receiving the first request, a second request for a second list of user identifiers associated with a corresponding one or more users and sending to a third entity, a third request for one or more tags assigned to private data of the one or more users;

merging, in response to the first entity receiving the second list and the one or more tags, the second list with the one or more tags in order to generate the first list;

sending the first list to the first data processing node;

receiving a communication request comprising a first user identifier and a first tag each selected from the first list, wherein the first user identifier and the first tag are associated with a first user, from the first data processing node, using the first user identifier and the first tag to derive first private data associated with the first user in accordance with the data structure; and using the derived first private data to process the communication request, such that the first private data is not stored on the first data processing node.

2. The method as claimed in claim 1, wherein the first request is associated with a first protocol, further comprising: generating at least one of: the second request and the third request in accordance with a second protocol, wherein the second protocol is different from the first protocol.

3. The method as claimed in claim 1, wherein the private data is associated with a method of communication.

4. The method as claimed in claim 1, wherein the numerical value is an aggregated value of individual values of individual tags.

5. The method as claimed in claim 1, wherein the second entity comprises an application for managing one or more lists.

6. The method as claimed in claim 1, wherein the third entity comprises a social networking application.

7. The method as claimed in claim 1, wherein the communication request further comprises a second user identifier, a second tag and second private data associated with a second user.

8. The method as claimed in claim 1, further comprising the steps of:
publishing the first request from the first data processing node using a publishing and subscribe protocol;
receiving, by a matching engine, the published first request and matching a topic of the published first request with a list of one or more subscribers subscribed to said topic;
sending the published first request from the matching engine to the first entity, wherein the first entity is associated with the second data processing node and the second data processing node is subscribed to said topic.

9. The method as claimed in claim 1, wherein the step of sending the first list to the first data processing node comprises the steps of:
publishing the first list from the second data processing node using a publishing and subscribe protocol;
receiving, by a matching engine, the published first list and matching a topic of the published first list with a list of one or more subscribers subscribed to said topic;
sending the published first list from the matching engine to the first data processing node, wherein the first data processing node is subscribed to said topic.

10. The method as claimed in claim 1, wherein the first data processing node comprises a client data processing system and the second data processing node comprises a server data processing system.

11. The method as claimed in claim 10, wherein the first entity is associated with the server data processing system.

12. A program product, comprising:
a recordable computer readable medium; and program code stored on the recordable computer readable storage medium and configured upon execution to mask data in communications between a first data processing node and a second data processing node, comprising the steps of:
assigning a user identifier and a tag to private data associated with a user, wherein the user identifier and the tag are associated with the private data in a data structure associated with the second data processing node, and wherein the tag comprises a numerical value associated with one or more methods of communication by which a user contact prefers to be contacted;
receiving, by a first entity, a first request for a first list from the first data processing node;
sending to a second entity, in response to the first entity receiving the first request, a second request for a second list of user identifiers associated with a corresponding one or more users;
sending to a third entity, in response to the first entity receiving the first request, a third request for one or more tags assigned to private data of the one or more users;
merging, in response to the first entity receiving the second list and the one or more tags, the second list with the one or more tags in order to generate the first list;
sending the first list to the first data processing node;
receiving a communication request comprising a first user identifier and a first tag each selected from the first list, wherein the first user identifier and the first tag are associated with a first user, from the first data processing node;
using the first user identifier and the first tag to derive first private data associated with the first user in accordance with the data structure; and
using the derived first private data to process the communication request, such that the first private data is not stored on the first data processing node.

13. The program product of claim 12, wherein the first request is associated with a first protocol, further comprising:
generating at least one of: the second request and the third request in accordance with a second protocol, wherein the second protocol is different from the first protocol.

14. The program product of claim 12, wherein the private data is operable to be associated with a method of communication.

15. The program product of claim 12, wherein the numerical value is an aggregated value of individual values of individual tags.

16. The program product of claim 12, wherein the second entity comprises an application for managing one or more lists.

17. The program product of claim 12, wherein the third entity comprises a social networking application.

18. The program product of claim 12, wherein the communication request further comprises a second user identifier, a second tag and second private data associated with a second user.

19. The program product of claim 12, further comprising the steps of:
publishing the first request from the first data processing node using a publishing and subscribe protocol;
receiving, by a matching engine, the published first request and matching a topic of the published first request with a list of one or more subscribers subscribed to said topic;
sending the published first request from the matching engine to the first entity, wherein the first entity is associated with the second data processing node and the second data processing node is subscribed to said topic.

20. The program product of claim 12, wherein the step of sending the first list to the first data processing node comprises the steps of:
publishing the first list from the second data processing node using a publishing and subscribe protocol;
receiving, by a matching engine, the published first list and matching a topic of the published first list with a list of one or more subscribers subscribed to said topic;
sending the published first list from the matching engine to the first data processing node, wherein the first data processing node is subscribed to said topic.

21. The program product of claim 12, wherein the first data processing node comprises a client data processing system and the second data processing node comprises a server data processing system.

22. The program product of claim 21, wherein the first entity is associated with the server data processing system.

* * * * *